US012565908B2

(12) United States Patent
Jones et al.

(10) Patent No.: US 12,565,908 B2
(45) Date of Patent: Mar. 3, 2026

(54) CARABINER DIVIDER AND FALL ARREST SYSTEM

(71) Applicant: Latchways Plc, Devizes (GB)

(72) Inventors: Owain Jones, Devizes (GB); Karl Jones, Devizes (GB)

(73) Assignee: MSA Technology, LLC, Cranberry Township, PA (US)

( * ) Notice: Subject to any disclaimer, the term of this patent is extended or adjusted under 35 U.S.C. 154(b) by 1021 days.

(21) Appl. No.: 17/208,899

(22) Filed: Mar. 22, 2021

(65) Prior Publication Data

US 2021/0207646 A1     Jul. 8, 2021

Related U.S. Application Data

(63) Continuation of application No. 15/753,761, filed as application No. PCT/GB2016/052471 on Aug. 9, 2016, now Pat. No. 10,954,992.

(30) Foreign Application Priority Data

Aug. 21, 2015   (GB) .................................... 1514916

(51) Int. Cl.
| F16B 45/02 | (2006.01) |
| A62B 35/00 | (2006.01) |
| A63B 29/02 | (2006.01) |

(52) U.S. Cl.
CPC ........ *F16B 45/027* (2021.05); *A62B 35/0037* (2013.01); *A62B 35/0043* (2013.01); *A63B 29/02* (2013.01); *F16B 45/023* (2021.05)

(58) Field of Classification Search
CPC ...... F16B 45/027; F16B 45/023; F16B 45/02; A62B 35/0037; A62B 35/0043; A62B 35/0068; A62B 35/0075; A62B 35/00; A62B 1/06; A63B 29/02; F16G 11/14
See application file for complete search history.

(56) References Cited

U.S. PATENT DOCUMENTS

| 1,642,322 A | * | 9/1927 | Beck ........................ F16B 45/02 |
| | | | 24/599.2 |
| 3,869,021 A | * | 3/1975 | Sutherland ......... A62B 35/0025 |
| | | | 182/7 |
| 4,019,609 A | * | 4/1977 | Wagner .................. A62B 35/04 |
| | | | 182/5 |

(Continued)

FOREIGN PATENT DOCUMENTS

| EP | 0976936 A1 | 2/2000 | |
| EP | 2333359 A1 * | 6/2011 | .............. F16B 45/02 |

(Continued)

*Primary Examiner* — Brian D Mattei
*Assistant Examiner* — Kathleen M. McFarland
(74) *Attorney, Agent, or Firm* — Jones Day

(57) ABSTRACT

A divider for a carabiner in a fall arrest system, the carabiner having a frame; and an openable gate and configured to be moved between an open position and a closed position, the divider comprising a body having: (i) a central body portion; and (ii) a plurality of connection portions extending from the central body portion and configured to attach the divider to at least a portion of the frame, wherein the plurality of connection portions are spaced and divide the carabiner into a plurality of areas for connection of the at least one component of the harness arrangement and the at least one fall arrest device.

21 Claims, 6 Drawing Sheets

(56)　　　　　References Cited

U.S. PATENT DOCUMENTS

| | | | | | |
|---|---|---|---|---|---|
| 4,667,772 | A | * | 5/1987 | Kammerer | A62B 35/04 24/136 L |
| 5,287,943 | A | * | 2/1994 | Bell | A62B 35/04 182/3 |
| 5,947,229 | A | * | 9/1999 | Hede | A62B 1/04 182/5 |
| 7,228,601 | B2 | * | 6/2007 | Thompson | F16B 45/02 24/598.2 |
| 7,475,456 | B2 | * | 1/2009 | Thompson | F16B 45/037 24/600.1 |
| 7,946,387 | B2 | * | 5/2011 | Betcher | A62B 35/0093 182/232 |
| 9,174,073 | B2 | * | 11/2015 | Casebolt | A62B 35/04 |
| 9,273,717 | B2 | * | 3/2016 | Schlangen | F16B 45/027 |
| 9,427,608 | B2 | * | 8/2016 | Fink | A62B 35/0075 |
| 9,707,421 | B2 | * | 7/2017 | Casebolt | F16F 7/006 |
| 10,016,638 | B2 | * | 7/2018 | Casebolt | A62B 35/04 |
| 10,343,001 | B2 | * | 7/2019 | Seman | A62B 35/0075 |
| 10,954,992 | B2 | * | 3/2021 | Jones | F16B 45/027 |
| 11,806,559 | B2 | * | 11/2023 | Auston | A62B 35/0031 |
| 11,813,487 | B2 | * | 11/2023 | Stephenson | A62B 35/0037 |
| 2003/0167608 | A1 | * | 9/2003 | Petzl | F16B 45/04 24/600.2 |
| 2005/0229367 | A1 | * | 10/2005 | Thompson | F16B 45/037 24/599.9 |
| 2005/0263103 | A1 | * | 12/2005 | Updyke | A01K 27/00 119/796 |
| 2006/0207073 | A1 | * | 9/2006 | Petzl | F16B 45/023 24/598.2 |
| 2007/0186393 | A1 | * | 8/2007 | Thompson | F16B 45/037 24/599.9 |
| 2008/0060872 | A1 | * | 3/2008 | Wise | A62B 35/0006 182/3 |
| 2009/0211849 | A1 | * | 8/2009 | Smith | A62B 35/0037 182/236 |
| 2010/0186202 | A1 | * | 7/2010 | Schwappach | F16B 45/02 29/428 |
| 2011/0284323 | A1 | * | 11/2011 | Ayre | A62B 1/14 182/5 |
| 2012/0324684 | A1 | * | 12/2012 | Codega | F16B 45/026 24/599.4 |
| 2013/0104351 | A1 | * | 5/2013 | Casebolt | F16B 45/04 24/522 |
| 2013/0104374 | A1 | * | 5/2013 | Schlangen | F16B 45/022 24/600.2 |
| 2014/0060966 | A1 | * | 3/2014 | Patel | A44B 11/04 24/265 AL |
| 2014/0227022 | A1 | * | 8/2014 | Casebolt | F16F 7/006 403/57 |
| 2014/0262608 | A1 | * | 9/2014 | Patel | F16B 45/035 24/592.11 |
| 2014/0331459 | A1 | * | 11/2014 | Fink | A62B 35/0037 24/302 |
| 2016/0281766 | A1 | * | 9/2016 | Moine | F16B 45/027 |
| 2018/0283439 | A1 | * | 10/2018 | Jones | A62B 35/0043 |
| 2021/0207646 | A1 | * | 7/2021 | Jones | F16B 45/02 |

FOREIGN PATENT DOCUMENTS

| | | | | | |
|---|---|---|---|---|---|
| EP | 2541457 | A2 | * | 1/2013 | G06F 21/445 |
| GB | 0976936 | A1 | * | 2/2000 | |
| GB | 2340173 | A | * | 2/2000 | F16B 45/02 |
| GB | 2541457 | A | | 2/2017 | |
| WO | WO-9312838 | A1 | * | 7/1993 | A62B 35/04 |
| WO | WO-2005073571 | A1 | * | 8/2005 | F16B 45/02 |

* cited by examiner

CARABINER DIVIDER AND FALL ARREST SYSTEM

CROSS REFERENCE TO RELATED APPLICATIONS

This application is a continuation of U.S. application Ser. No. 15/753,761, filed Aug. 9, 2016, which is the United States national phase of International Application No. PCT/GB2016/052471 filed Aug. 9, 2016, and claims priority to United Kingdom Application Serial No. 1514916.4, filed Aug. 21, 2015, the entire contents of which are hereby incorporated by reference.

BACKGROUND OF THE INVENTION

Field of the Invention

This invention relates generally to a fall arrest system, and more particularly to a divider for a carabiner used in a fall arrest system that provides a secure connection to fall arrest devices for users working in specified environments and applications, such as an operator working at height.

Description of the Related Art

Fall arrest systems and devices, e.g., self-retracting lanyards and harnesses, are used to prevent personnel working at heights from suffering injury as a result of falling or other such events. Fall arrest systems are often referred to as height safety systems or fall protection systems. For example, such fall arrest systems may be used in such applications as skyscraper window cleaning, maintenance activities, construction operations, and/or in various embodiments where there is a risk of falling from some height. In order to effectively use such a fall arrest device, it must be secured or anchored to some immovable structure, such as a building, a railing, an embedded anchor point, and the like. Accordingly, in the event of a fall, the fall arrest device, which is attached to the user's harness via a carabiner or similar connector, includes a safety line with a connector, e.g., a carabiner, attached to the anchor point, which brakes or arrests the user's fall using this immovable anchor point.

Individuals working in such environments require safety equipment that allows them to perform operations in an ergonomic manner without the risk of falling or injury. In many cases, these workers need to be connected to more than one anchor point or fall arrest device simultaneously. Therefore, various devices and systems have been developed to provide a device or system that securely attaches to a fall-safety harness worn by a user, and connects the user to more than one anchor point, lifeline, system, or other safety device. One exemplary system is the commercially-available Miller Twin Turbo with G2 Twin Connector. This system is described in U.S. Publication No. 2014/0331459 and includes a twin connector carabiner through which harness straps pass, and also to which twin lifelines can be attached. Accordingly, the user can move around a space ensuring that, at all times, at least one of the twin lifelines is connected to a suitable anchor point. Further, the twin connector shown and described in U.S. Publication No. 2014/0331459 utilizes a webbing divider clip that is mounted to the gate of the carabiner and is provided with limbs that divide the space of the carabiner connector into a webbing retaining portion opposite the carabiner gate and side portions through which the lifelines can be connected on opposed sides of the connector. The gate in the embodiment described is a two-stage opening gate, which requires the gate first to be twisted rotationally about its axis and only then opened. There are also commercially-available carabiners that require three stage opening processes in which the gate is required to be longitudinally slid in addition to being twisted to rotate about its axis before being pivoted open.

There is a need in the art for improved carabiners and beneficial components for use with such carabiners in fall arrest systems that facilitate the connection of the user (via his or her harness) to multiple anchor points while engaging in the desired activity or environment.

SUMMARY OF THE INVENTION

Accordingly and generally, provided is an improved carabiner divider for use with a carabiner and in connection with a fall arrest device or in a fall arrest system. Preferably, provided is an improved carabiner divider for use with a carabiner and in connection with a fall arrest system that is simple in connection and operation.

According to one preferred and a non-limiting embodiment or aspect, provided is a divider for a carabiner in a fall arrest system, the carabiner having: (1) a frame; and (2) an openable gate attached to the frame and configured to be moved between an open position, wherein at least one component of a harness arrangement and at least one fall arrest device can be attached to or detached from the frame, and a closed position, wherein the at least one component of the harness arrangement and the at least one fall arrest device can be secured to the frame, the divider comprising a body having: (i) a central body portion; and (ii) a plurality of connection portions extending from the central body portion and configured to attach the divider to at least a portion of the frame, wherein the plurality of connection portions are spaced and divide the carabiner into a plurality of areas for connection of the at least one component of the harness arrangement and the at least one fall arrest device.

In one preferred and a non-limiting embodiment or aspect, at least one connection portion of the plurality of connection portions comprises a collar extending around the frame. In another preferred and a non-limiting embodiment or aspect, the collar is positioned substantially adjacent to and spaced from one end of the gate. In a further preferred and non-limiting embodiment or aspect, the collar is configured to facilitate the swiveling of the divider from an engaged position, wherein all of the plurality of connection portions are attached to the frame, to a disengaged position, wherein only the collar remains attached to the frame.

In one preferred and a non-limiting embodiment or aspect, when attached, at least one of the plurality of connection portions is slidable along the frame and configured to facilitate complete removal of the divider from the carabiner.

In one preferred and a non-limiting embodiment or aspect, at least one connection portion of the plurality of connection portions are removably attachable to the frame. In another preferred and non-limiting embodiment or aspect, the at least one connection portion comprises a substantially C-shaped clip member that is configured to fit at least partially around at least a portion of the frame. In a further preferred and non-limiting embodiment or aspect, the substantially C-shaped clip member is substantially deformable or flexible, such that the substantially C-shaped clip member can be frictionally engaged with the frame.

In one preferred and a non-limiting embodiment or aspect, at least a portion of the body is positionable substantially adjacent the gate. In another preferred and non-limiting embodiment or aspect, the central body portion comprises at least one edge extending substantially adjacent to a side of the gate, such that, when the divider is attached to the frame, the gate is prevented from pivoting to the open position. In a further preferred and non-limiting embodiment or aspect, the central body portion comprises at least one stop formation positioned substantially adjacent an end of the gate, such that, when the divider is attached to the frame, the gate is prevented from longitudinally sliding.

In one preferred and a non-limiting embodiment or aspect, the plurality of connection portions define four areas, comprising: (1) a first area for connection of a first fall arrest device; (2) a second area for connection of a second fall arrest device; (3) a third area for connection of the at least one component of the harness arrangement; and (4) a fourth area at least partially surrounding the gate.

In one preferred and a non-limiting embodiment or aspect, the divider further comprises at least one rib formed on the body at least partially along at least one of the plurality of connection portions.

In one preferred and a non-limiting embodiment or aspect, the at least one fall arrest device comprises a first fall arrest device and a second fall arrest device.

According to one preferred and a non-limiting embodiment or aspect, provided is a fall arrest system, comprising: a harness arrangement removably attachable to a user; at least one fall arrest device having a safety line (either fixed or extendable) having a connector on an end thereof, the connector configured to be secured to an anchor point; a carabiner comprising a frame and an openable gate attached to the frame and configured to be moved between an open position, wherein at least one component of the harness arrangement and at least one fall arrest device can be attached to or detached from the frame, and a closed position, wherein the at least one component of the harness arrangement and the at least one fall arrest device can be secured to the frame; and a divider comprising a body having: (i) a central body portion; and (ii) a plurality of connection portions extending from the central body portion and configured to attach the divider to at least a portion of the frame, wherein the plurality of connection portions are spaced and divide the carabiner into a plurality of areas for connection of the at least one component of the harness arrangement and the at least one fall arrest device.

In one preferred and a non-limiting embodiment or aspect, at least a portion of the body of the divider is positionable substantially adjacent the gate.

In one preferred and a non-limiting embodiment or aspect, the plurality of connection portions define four areas, comprising: (1) a first area for connection of a first fall arrest device; (2) a second area for connection of a second fall arrest device; (3) a third area for connection of the at least one component of the harness arrangement; and (4) a fourth area at least partially surrounding the gate.

In one preferred and a non-limiting embodiment or aspect, the at least one component of the harness arrangement comprises at least one of the following: a harness connector, at least one strap of the harness arrangement, or any combination thereof.

In one preferred and a non-limiting embodiment or aspect, the at least one fall arrest device comprises at least one clip member, wherein the at least one clip member is configured for attachment to the frame in at least one of the plurality of areas.

In one preferred and a non-limiting embodiment or aspect, the at least one fall arrest device comprises a first fall arrest device and a second fall arrest device.

According to one preferred and a non-limiting embodiment or aspect, provided is a fall protection apparatus, comprising: a carabiner having a frame and an openable gate; and a divider secured to the carabiner, the divider having a collar connection to the carabiner enabling rotation of the divider on the carabiner, wherein: (1) the collar is mounted on the carabiner frame but spaced from the gate; and/or (2) the divider includes a stop formation positioned adjacent a longitudinal end face of the gate when in a gate-closed, divider-secured position; and/or (3) the divider includes, in addition to the collar, three spaced divider connectors arranged to connect to the frame of the carabiner.

In one preferred and a non-limiting embodiment or aspect, the divider has a longitudinally running edge closely adjacent a longitudinal surface of the gate, thereby inhibiting pivoting of the gate.

In one preferred and a non-limiting embodiment or aspect, the collar is rotatable on the frame of the carabiner.

In one preferred and a non-limiting embodiment or aspect, the collar is a complete collar extending in a continuous ring or annulus about the frame.

In one preferred and a non-limiting embodiment or aspect, the collar is mounted adjacent the gate.

In one preferred and a non-limiting embodiment or aspect, the collar is mounted adjacent a pivot portion of the gate.

In one preferred and a non-limiting embodiment or aspect, the collar is slidable over and around the frame of the carabiner for mounting on the carabiner.

In one preferred and a non-limiting embodiment or aspect, the stop formation is positioned at the opposite end of the gate from a pivot portion of the gate.

In one preferred and a non-limiting embodiment or aspect, the stop formation comprises a shoulder formed in a central portion of the divider.

In one preferred and a non-limiting embodiment or aspect, the stop formation comprises a shoulder formed at the end of a recess which accommodates an outer surface of the gate.

In one preferred and a non-limiting embodiment or aspect, the three spaced divider connectors comprise open jaws facing in a common direction.

In one preferred and a non-limiting embodiment or aspect, the divider divides the carabiner into four openings, including: a first opening for one or more harness straps to pass, a second opening to accommodate the gate, and spaced openings at either side to accommodate securing of fall arrest devices.

In one preferred and a non-limiting embodiment or aspect, the gate is required to twist and/or rotate about an axis in order to be able to pivot to an open position.

In one preferred and a non-limiting embodiment or aspect, the gate is required to move in the direction of its longitudinal axis in order to be able to pivot to an open position.

According to one preferred and a non-limiting embodiment or aspect, provided is a carabiner divider having a central body portion and at least four attachment points; at least one attachment point comprising a complete ring collar and the remaining attachment points comprising open jaws facing in a common direction, the ring collar and jaws being provided at separate corners of the central body portion.

In one preferred and a non-limiting embodiment or aspect, the central body portion has a recessed portion in an outer edge, the recessed portion terminating in a shoulder stop formation.

In one preferred and a non-limiting embodiment or aspect, the recessed portion terminates in a shoulder stop formation provided between the complete ring collar and one of the remaining attachment points.

According to one preferred and a non-limiting embodiment or aspect, provided is a fall protection apparatus, comprising: a carabiner having a frame and an openable gate; and a carabiner divider having a central body portion and at least four attachment points, at least one attachment point comprising a complete ring collar and the remaining attachment points comprising open jaws facing in a common direction, the ring collar and jaws being provided at separate corners of the central body portion.

In one preferred and a non-limiting embodiment or aspect, the central body portion has a recessed portion in an outer edge, the recessed portion accommodating the outer surface of the gate and/or terminating in a shoulder stop formation positioned adjacent the longitudinal end of the gate.

Further non-limiting embodiments or aspects will now be described in the following numbered clauses.

Clause 1. A divider for a carabiner in a fall arrest system, the carabiner having: (1) a frame; and (2) an openable gate attached to the frame and configured to be moved between an open position, wherein at least one component of a harness arrangement and at least one fall arrest device can be attached to or detached from the frame, and a closed position, wherein the at least one component of the harness arrangement and the at least one fall arrest device can be secured to the frame, the divider comprising a body having: (i) a central body portion; and (ii) a plurality of connection portions extending from the central body portion and configured to attach the divider to at least a portion of the frame, wherein the plurality of connection portions are spaced and divide the carabiner into a plurality of areas for connection of the at least one component of the harness arrangement and the at least one fall arrest device.

Clause 2. The divider of clause 1, wherein at least one connection portion of the plurality of connection portions comprises a collar extending around the frame.

Clause 3. The divider of clause 1 or 2, wherein the collar is positioned substantially adjacent to and spaced from one end of the gate.

Clause 4. The divider of any of clauses 1-3, wherein the collar is configured to facilitate the swiveling of the divider from an engaged position, wherein all of the plurality of connection portions are attached to the frame, to a disengaged position, wherein only the collar remains attached to the frame.

Clause 5. The divider of any of clauses 1-4, wherein, when attached, at least one of the plurality of connection portions is slidable along the frame and configured to facilitate complete removal of the divider from the carabiner.

Clause 6. The divider of any of clauses 1-5, wherein at least one connection portion of the plurality of connection portions are removably attachable to the frame.

Clause 7. The divider of any of clauses 1-6, wherein the at least one connection portion comprises a substantially C-shaped clip member that is configured to fit at least partially around at least a portion of the frame.

Clause 8. The divider of any of clauses 1-7, wherein the substantially C-shaped clip member is substantially deformable or flexible, such that the substantially C-shaped clip member can be frictionally engaged with the frame.

Clause 9. The divider of any of clauses 1-8, wherein at least a portion of the body is positionable substantially adjacent the gate.

Clause 10. The divider of any of clauses 1-9, wherein the central body portion comprises at least one edge extending substantially adjacent to a side of the gate, such that, when the divider is attached to the frame, the gate is prevented from pivoting to the open position.

Clause 11. The divider of any of clauses 1-10, wherein the central body portion comprises at least one stop formation positioned substantially adjacent an end of the gate, such that, when the divider is attached to the frame, the gate is prevented from longitudinally sliding.

Clause 12. The divider of any of clauses 1-11, wherein the plurality of connection portions define four areas, comprising: (1) a first area for connection of a first fall arrest device; (2) a second area for connection of a second fall arrest device; (3) a third area for connection of the at least one component of the harness arrangement; and (4) a fourth area at least partially surrounding the gate.

Clause 13. The divider of any of clauses 1-12, further comprising at least one rib formed on the body at least partially along at least one of the plurality of connection portions.

Clause 14. The divider of any of clauses 1-13, wherein the at least one fall arrest device comprises a first fall arrest device and a second fall arrest device.

Clause 15. A fall arrest system, comprising: a harness arrangement removably attachable to a user; at least one fall arrest device having a safety line (either fixed or extendable) having a connector on an end thereof, the connector configured to be secured to an anchor point; a carabiner comprising a frame and an openable gate attached to the frame and configured to be moved between an open position, wherein at least one component of the harness arrangement and the at least one fall arrest device can be attached to or detached from the frame, and a closed position, wherein the at least one component of the harness arrangement and the at least one fall arrest device can be secured to the frame; and a divider comprising a body having: (i) a central body portion; and (ii) a plurality of connection portions extending from the central body portion and configured to attach the divider to at least a portion of the frame, wherein the plurality of connection portions are spaced and divide the carabiner into a plurality of areas for connection of the at least one component of the harness arrangement and the at least one fall arrest device.

Clause 16. The fall arrest system of clause 15, wherein at least a portion of the body of the divider is positionable substantially adjacent the gate.

Clause 17. The fall arrest system of clause 15 or 16, wherein the plurality of connection portions define four areas, comprising: (1) a first area for connection of a first fall arrest device; (2) a second area for connection of a second fall arrest device; (3) a third area for connection of the at least one component of the harness arrangement; and (4) a fourth area at least partially surrounding the gate.

Clause 18. The fall arrest system of any of clauses 15-17, wherein the at least one component of the harness arrangement comprises at least one of the following: a harness connector, at least one strap of the harness arrangement, or any combination thereof.

Clause 19. The fall arrest system of any of clauses 15-18, wherein the at least one fall arrest device comprises at least one clip member, wherein the at least one clip member is configured for attachment to the frame in at least one of the plurality of areas.

Clause 20. The fall arrest system of any of clauses 15-19, wherein the at least one fall arrest device comprises a first fall arrest device and a second fall arrest device.

Clause 21. A fall protection apparatus, comprising: a carabiner having a frame and an openable gate; and a divider secured to the carabiner, the divider having a collar connection to the carabiner enabling rotation of the divider on the carabiner, wherein: (1) the collar is mounted on the carabiner frame but spaced from the gate; and/or (2) the divider includes a stop formation positioned adjacent a longitudinal end face of the gate when in a gate-closed, divider-secured position; and/or (3) the divider includes, in addition to the collar, three spaced divider connectors arranged to connect to the frame of the carabiner.

Clause 22. The fall protection apparatus of clause 21, wherein the divider has a longitudinally running edge closely adjacent a longitudinal surface of the gate, thereby inhibiting pivoting of the gate.

Clause 23. The fall protection apparatus of clause 21 or 22, wherein the collar is rotatable on the frame of the carabiner.

Clause 24. The fall protection apparatus of any of clauses 21-23, wherein the collar is a complete collar extending in a continuous ring or annulus about the frame.

Clause 25. The fall protection apparatus of any of clauses 21-24, wherein the collar is mounted adjacent the gate.

Clause 26. The fall protection apparatus of any of clauses 21-25, wherein the collar is mounted adjacent a pivot portion of the gate.

Clause 27. The fall protection apparatus of any of clauses 21-26, wherein the collar is slidable over and around the frame of the carabiner for mounting on the carabiner.

Clause 28. The fall protection apparatus of any of clauses 21-27, wherein the stop formation is positioned at the opposite end of the gate from the pivot portion of the gate.

Clause 29. The fall protection apparatus of any of clauses 21-28, wherein the stop formation comprises a shoulder formed in a central portion of the divider.

Clause 30. The fall protection apparatus of any of clauses 21-29, wherein the stop formation comprises a shoulder formed at an end of a recess which accommodates an outer surface of the gate.

Clause 31. The fall protection apparatus of any of clauses 21-30, wherein the three spaced divider connectors comprise open jaws facing in a common direction.

Clause 32. The fall protection apparatus of any of clauses 21-31, wherein the divider divides the carabiner into four openings, including: a first opening for one or more harness straps to pass, a second opening to accommodate the gate, and spaced openings at either side to accommodate securing of fall arrest devices.

Clause 33. The fall protection apparatus of any of clauses 21-32, wherein the gate is required to twist and/or rotate about an axis in order to be able to pivot to an open position.

Clause 34. The fall protection apparatus of any of clauses 21-33, wherein the gate is required to move in a direction of its longitudinal axis in order to be able to pivot to the open position.

Clause 35. A carabiner divider having a central body portion and at least four attachment points; at least one attachment point comprising a complete ring collar and the remaining attachment points comprising open jaws facing in a common direction, the ring collar and jaws being provided at separate corners of the central body portion.

Clause 36. The carabiner divider of clause 35, wherein the central body portion has a recessed portion in an outer edge, the recessed portion terminating in a shoulder stop formation.

Clause 37. The carabiner divider of clause 36, wherein the recessed portion terminates in the shoulder stop formation provided between the complete ring collar and one of the remaining attachment points.

Clause 38. A fall protection apparatus, comprising: a carabiner having a frame and an openable gate; and a carabiner divider having a central body portion and at least four attachment points, at least one attachment point comprising a complete ring collar and the remaining attachment points comprising open jaws facing in a common direction, the ring collar and jaws being provided at separate corners of the central body portion.

Clause 39. The fall protection apparatus of clause 38, wherein the central body portion has a recessed portion in an outer edge, the recessed portion accommodating an outer surface of the gate and/or terminating in a shoulder stop formation positioned adjacent a longitudinal end of the gate.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various FIGS. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise. Preferred features will be elucidated in the claims and in the specific description of the embodiments that follow. It will be readily appreciated that preferred features of certain aspects or embodiments could be usefully incorporated in other described embodiments even if not specifically described in those terms herein.

DETAILED DESCRIPTION OF THE INVENTION

Figure 1:
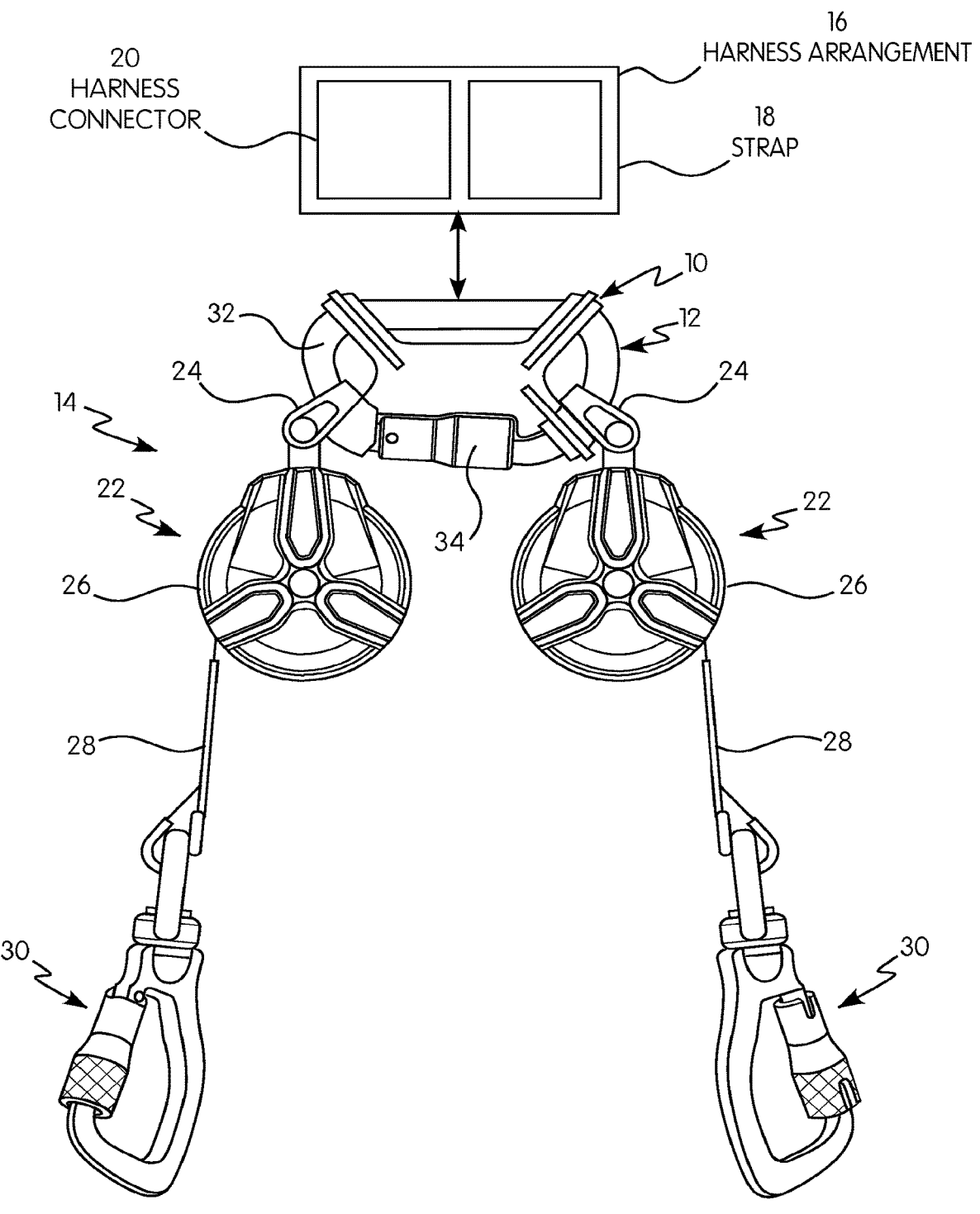
FIG. 1 is a front view of one embodiment of a fall arrest system according to the principles of the present invention.

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing FIGS. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

Figure 2:
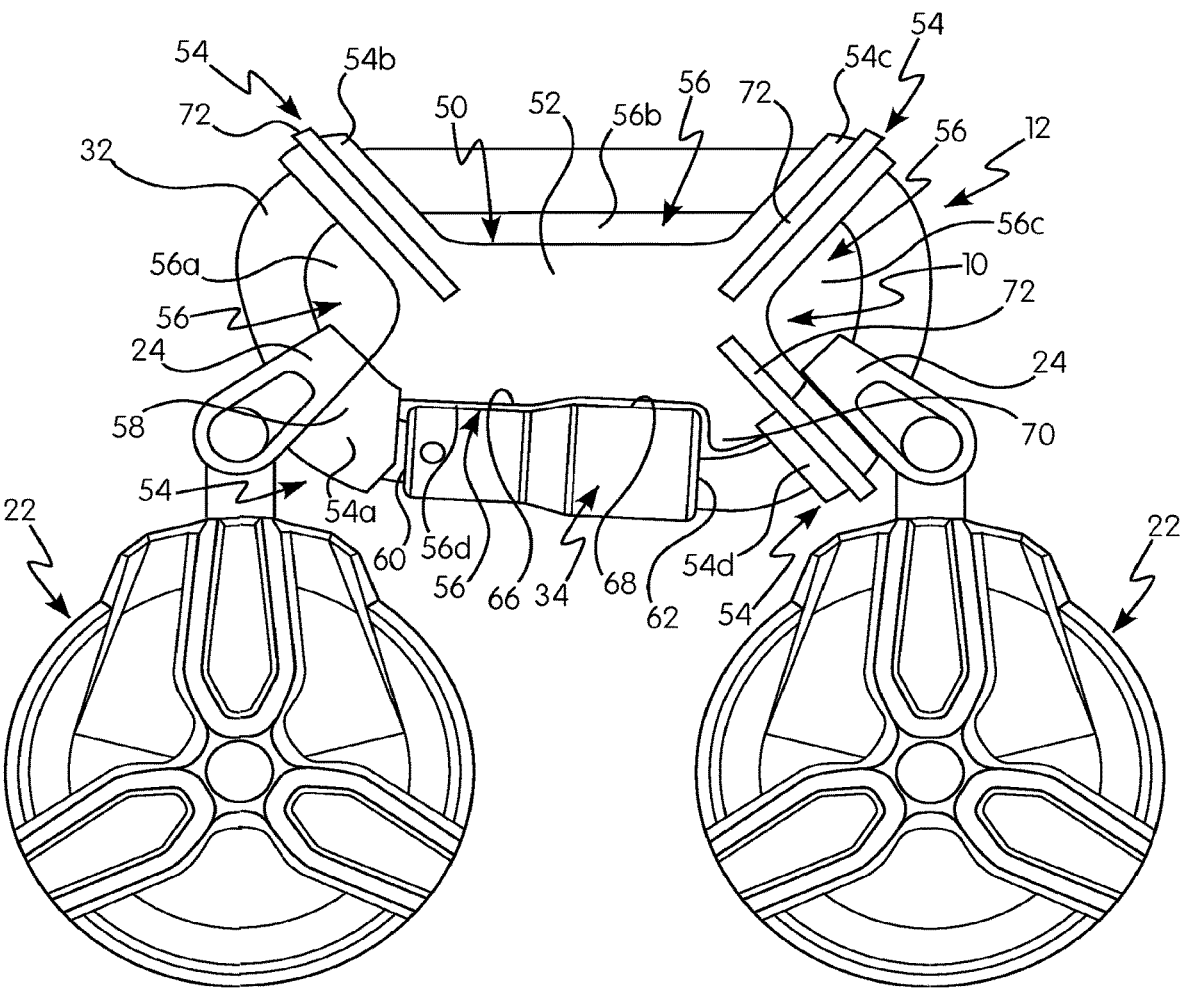
FIG. 2 is a front view of a portion of the fall arrest system of FIG. 1.

As illustrated in certain preferred and non-limiting embodiments or aspects in FIGS. 1-7, the present invention is directed to a divider 10 for a carabiner 12 in a fall arrest system 14. With reference to FIGS. 1 and 2, the fall arrest system 14 includes a harness arrangement 16 that is worn by the user, and this harness arrangement 16 includes at least one strap 18 that is directly or indirectly attached to or attachable to the carabiner 12. In one preferred and a non-limiting embodiment or aspect, the at least one strap 18 is directly attached to the carabiner 12, while in another preferred and non-limiting embodiment or aspect, the at least one strap 18 is directly or indirectly attached to a harness connector 20, which, in turn, is directly attached to the carabiner 12. This harness connector 20 is typically in the form of a D-ring connector. As is illustrated in FIGS. 1 and 2, and in one preferred and a non-limiting embodiment or aspect, the carabiner 12 is used to facilitate attachment between the harness arrangement 16 (i.e., the user) and at least one fall arrest device 22 (e.g., a connector element 24 of the fall arrest device 22). The connector element 24 may be configured to allow for the swiveling of a housing 26 of the fall arrest device 22, as well as at least partial rotation about the carabiner 12.

In another preferred and a non-limiting embodiment or aspect, the fall arrest system 14 includes a plurality of fall arrest devices 22 (such as a pair of fall arrest devices 22, as shown in FIG. 1). These fall arrest devices 22 may be in the form of a safety line device, a fall protection device, a self-retracting lanyard, a safety device, and the like. Further, these fall arrest devices 22 are removably connectable to the carabiner 12 and each include a lifeline 28 that pays out from and retracts into the housing 26 of each fall arrest device 22. Alternatively, and in the context and scope of the present invention, the fall arrest devices may use or incorporate either a fixed safety line or an extendable safety line. Still further, a connector 30, such as a carabiner or the like, is positioned on or attached to an end of each fall arrest device 22, i.e., the extending end of the lifeline 28, and each connector 30 is configured to be removably secured to some anchor point or secure point, such as a surface of a structure.

It is envisioned that the carabiner 12 can be configured, arranged, or modified to interact with a variety of makes and models of fall arrest systems and devices without departing from the spirit and scope hereof. It is further envisioned that the divider 10 according to the present invention may be configured, arranged, or modified to interact with a variety of makes and models of carabiners 12, such as the carabiner 12 shown in FIGS. 1-6 and the carabiner 12 shown in FIG. 7. Still further, in one preferred and a non-limiting embodiment or aspect, the carabiner 12 includes a frame 32 and an openable gate 34 attached to the frame 32 and configured to be moved between an open position, wherein at least one component (e.g., a strap 18 and/or a harness connector 20) of the harness arrangement 16 and at least one fall arrest device 22 (e.g., the connector element 24) can be attached to or detached from the frame 32, and a closed position, wherein the at least one component of the harness arrangement 16 and the at least one fall arrest device 22 (e.g., the connector element 24) can be secured to the frame 32. The gate 34 may be a two-stage opening gate which requires that the gate first be rotated or twisted about its axis and only then pivoted open, or a three-stage opening gate which requires that the gate be first slid longitudinally before the rotation and pivot steps required for the two-stage opening gate.

In one preferred and a non-limiting embodiment or aspect, and with reference to FIGS. 2-7, the divider 10 includes a body 50 having a central body portion 52 and a plurality of connection portions 54 extending from the central body portion 52. The connection portions 54 are sized, shaped, or configured to attach the divider 10 to at least a portion of the frame 32, and further, these connection portions 54 are spaced and divide the carabiner 12 into a plurality of areas 56 for connection of the at least one component of the harness arrangement 16 (e.g., a strap 18 and/or a harness connector 20) and the at least one fall arrest device 22, e.g., the twin fall arrest devices 22 illustrated in FIGS. 1 and 2.

Figure 3:
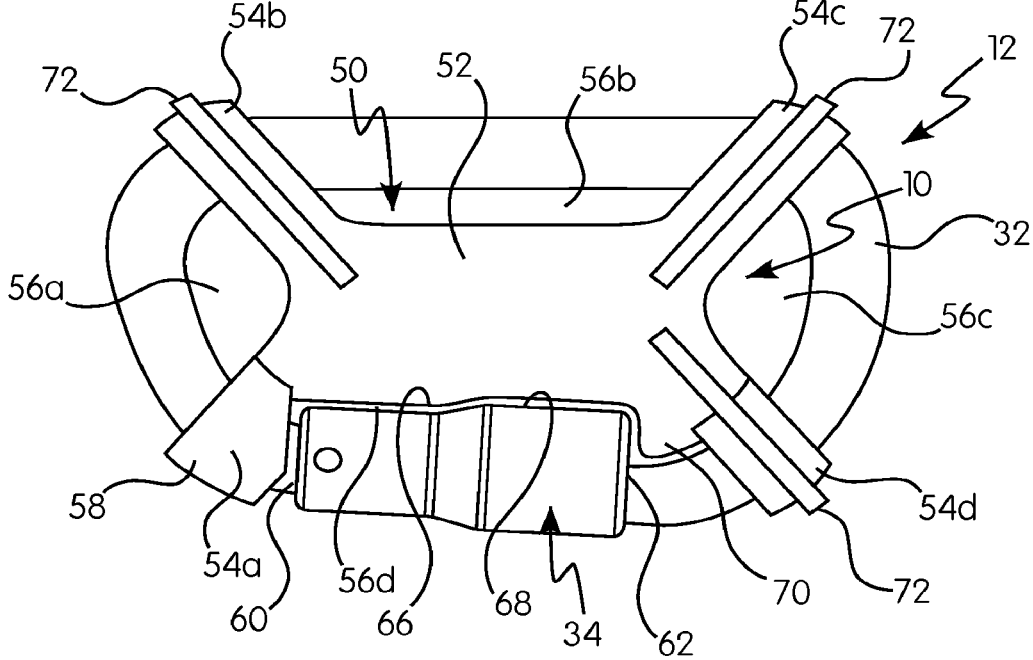
FIG. 3 is a front view of one embodiment of a carabiner with a divider according to the principles of the present invention.

In one preferred and a non-limiting embodiment or aspect, and as best illustrated in FIGS. 2 and 3, the plurality of connection portions 54a, 54b, 54c, 54d define four areas 56a, 56b, 56c, 56d, as follows: (1) a first area 56a for connection of a first fall arrest device 22; (2) a second area 56c for connection of a second fall arrest device 22; (3) a third area 56b for connection of the at least one component of the harness arrangement 16; and (4) a fourth area 56d at least partially surrounding the gate 34. Accordingly, in this embodiment, the carabiner 12 is divided or separated into four sections that are spaced from each other, and allow for the appropriate positioning and separation of the various connections and attached components in the fall arrest system 14. In addition, this separation reduces the risk of the various connections or connected components from impacting each other, twisting, or otherwise binding as the user is moving between anchor points and/or during routine operation.

In one preferred and a non-limiting embodiment or aspect, at least one connection portion 54 of the plurality of connection portions 54 is in the form of a collar 58 that extends around the frame 32 of the carabiner 12. In the illustrated embodiment, the connection portion 54a represents the collar 58. While, in this embodiment, the collar 58 extends completely around the frame 32, in other embodiments, the collar 58 may extend only partially around the frame 32. Further, and in one preferred and a non-limiting embodiment or aspect, the collar 58 (or one or all of the other connection portions 54) are substantially adjacent to and spaced from an end (e.g., a pivot point end 60 of the gate 34 and/or a pivoting end 62 of the gate 34). In the illustrated embodiment, the collar 58 is located substantially adjacent to and spaced from the pivot point end 60 of the gate 34. This beneficial positioning of the connection portion 54, e.g., the collar 58, on the frame 32 (as opposed to the gate 34) allows for the engagement and disengagement of the divider 10 without the simultaneous movement of the gate 34. In addition, this beneficial positioning of the connection portion 54, e.g., the collar 58, allows for the reduction in size of the collar 58, since it needs to only interact with the smaller-proportioned frame 32 diameter. Still further, this positioning reduces the chances that the divider 10 is accidentally removed from the carabiner 12 when the gate 34 is open, which would be a possibility if the divider 10 was connected to the gate 34.

In one preferred and a non-limiting embodiment or aspect, at least one of the connection portions 54, e.g., the collar 58, facilitates the swiveling of the divider 10 from an engaged position (FIGS. 3 and 4), wherein all of the plurality of connection portions 54 are attached to the frame 32, to a disengaged position (FIGS. 5 and 6), wherein only the collar 58 remains attached to the frame 32. While in the disengaged position, the user can easily attach or detach the fall arrest devices 22 (e.g., the connector element 24) and/or the component of the harness arrangement 16 (e.g., a strap 18 and/or a harness connector 20). Of course it is recognized that the strap 18 may be fed through the appropriate area 56*b* regardless of whether the divider 10 is engaged with or disengaged from the carabiner 12. Similarly, and in one preferred and a non-limiting embodiment or aspect, when attached, one or all of the connection portions 54 are slidable along the frame 32 and configured to facilitate complete removal of the divider 10 from the carabiner 12.

Figures 4, 5:
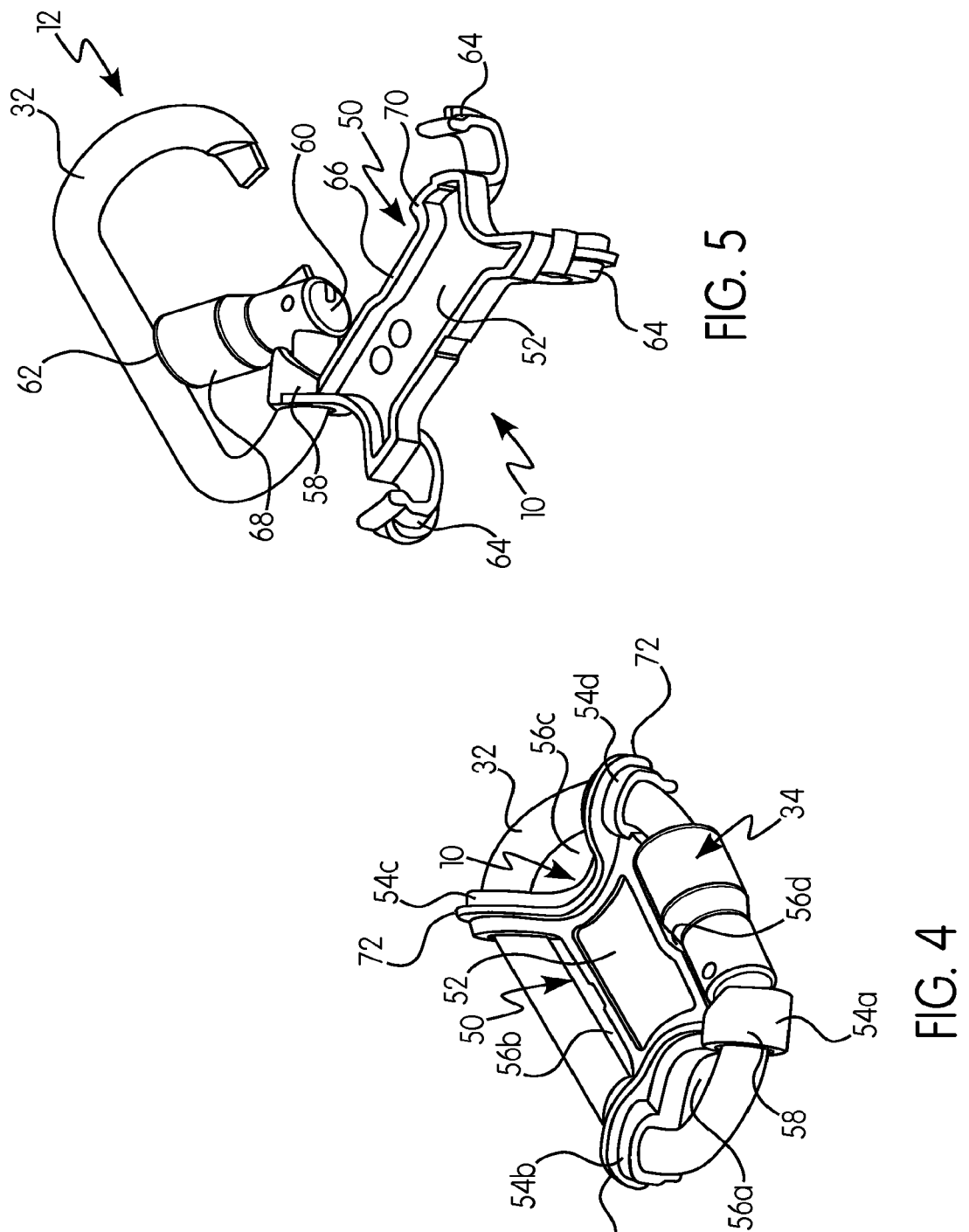
FIG. 4 is a perspective view of the carabiner and divider of FIG. 3 wherein the divider is fully attached to the carabiner and the gate of the carabiner is in the closed position.
FIG. 5 is a perspective view of the carabiner and divider of FIG. 3 wherein the divider is partially detached from the carabiner and the gate of the carabiner is in the open position.

In one preferred and a non-limiting embodiment or aspect, at least one connection portion 54 (e.g., connection portions 54*b*, 54*c*, 54*d*) of the plurality of connection portions 54 are removably attachable to the frame 32. For example, and as best illustrated in FIG. 5, one, some, or all of the connection portions 54 are in the form of a substantially C-shaped clip member 64 (e.g., a jaw structure) that is sized, shaped, or configured to fit at least partially around at least a portion of the frame 32. For example, in one preferred and a non-limiting embodiment or aspect, such a substantially C-shaped clip member 64 may be clamped over a portion of the frame 32, and in another preferred and non-limiting embodiment or aspect, the substantially C-shaped clip member 64 is substantially deformable or flexible, such that the substantially C-shaped clip member 64 can be frictionally engaged with the frame 32. In particular, the C-shaped clip member 64 may be formed from a flexible or deformable material, such as plastic, and snap-fit or clamped to the frame 32. Such an arrangement allows for the easy attachment to or detachment from the frame 32, and in the embodiment with the collar 58, these substantially C-shaped clip members 64 may be disengaged and pivot with the central body portion 52 to allow for attachment of the other components.

Figure 6:
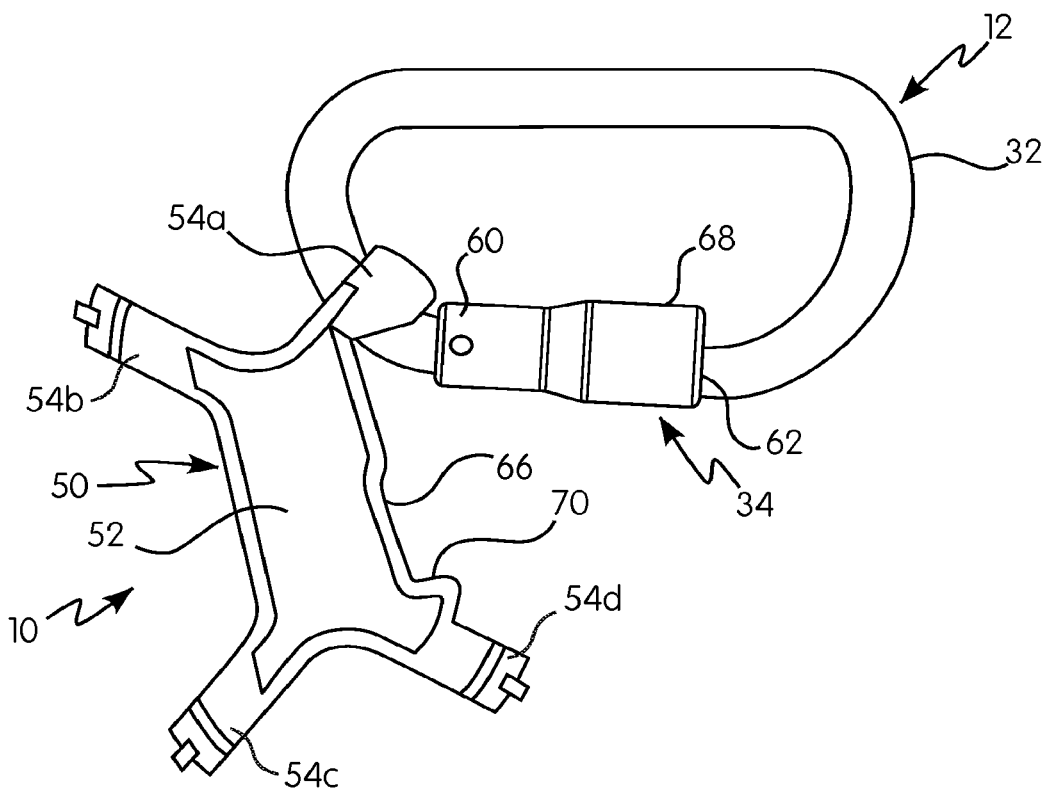
FIG. 6 is a perspective view of the carabiner and divider of FIG. 3 wherein the divider is partially detached from the carabiner and the gate of the carabiner is in the closed position.

In one preferred and a non-limiting embodiment or aspect, at least a portion of the body 50 is positionable substantially adjacent the gate 34, i.e., the gate 34 is located in an area 56, e.g., area 56*d*, formed by two connection portions 54, e.g., connection portions 54*a*, 54*d*. In another preferred and non-limiting embodiment or aspect, the central body portion 52 includes or is formed with at least one edge 66 extending substantially adjacent to a side 68 of the gate 34, such that, when the divider 10 is attached to the frame 32, the gate 34 is prevented from pivoting to the open position. As illustrated in FIGS. 2-4, when the divider 10 is engaged with the carabiner 12, the gate 34 is prevented from pivoting inward (as illustrated in FIGS. 5 and 6, when the divider 10 is disengaged from the carabiner 12). This protects against accidental pivoting/opening of the gate 34 while the divider 10 is attached to or engaged with the carabiner 12, and is equally effective with a two-stage or three-stage gate.

In one preferred and a non-limiting embodiment or aspect, the central body portion 52 includes or is formed with at least one stop formation 70 positioned substantially adjacent an end, e.g., the pivoting end 62, of the gate 34. Accordingly, and when the divider 10 is attached to the frame 32, the gate 34 is prevented from longitudinally sliding. In this manner, and as discussed above in connection with the edge 66, the stop formation 70 will protect against the accidental sliding (and, thereafter, pivoting/opening) of the gate 34 while the divider 10 is attached to or engaged with the carabiner 12, and is particularly effective with a three-stage gate. Further, this stop formation 70 may be a separate piece or integral to the body 50 of the divider 10. It is further envisioned that one of the connection portions 54 may be positioned or located on the carabiner 12 to provide the same prevention of longitudinal sliding of the gate 34.

In one preferred and a non-limiting embodiment or aspect, the divider 10 includes at least one rib 72 formed on the body 50 at least partially along at least one of the plurality of connection portions 54. Such a rib 72 may be used to strengthen the connection portion 54, particular after repeated engagements and disengagements of the divider 10. In addition, the rib 72 facilitates operation and manipulation of the divider 10.

Figure 7:
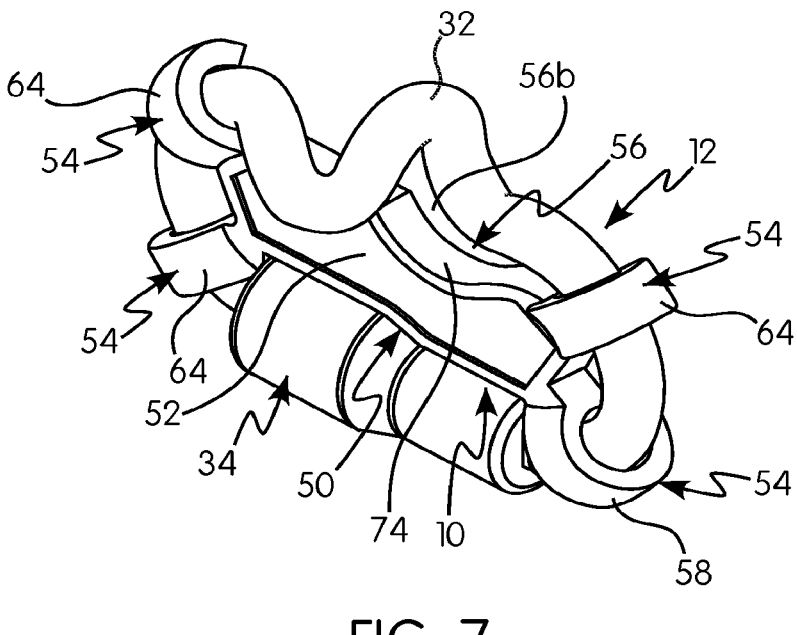
FIG. 7 is a perspective view of another embodiment of a carabiner with a divider according to the principles of the present invention.

In one preferred and a non-limiting embodiment or aspect, and as illustrated in FIG. 7, the divider 10 may be used in connection with a variety of different carabiners, such as the shaped carabiner 12, which is shown and described in Great Britain Patent Application No. 1514915.6. As illustrated, and in this embodiment, the central body portion 52 defining one of the areas 56, e.g., 56*b*, includes an indent 74. This indent 74 is sized, shaped, or configured to allow for the effective attachment of a harness connector 20 of the harness arrangement 16, such as a D-ring connector. Of course, it is envisioned that the body 50, the central body portion 52, and/or any of the connection portions 54 can be sized, shaped, or configured to accommodate differently sized and shaped components of the fall arrest system 14.

Accordingly, the divider 10 and fall arrest system 14 facilitates safe and effective engagement in activities by a user working in certain environments and applications.

Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope of the appended claims. For example, it is to be understood that the present invention contemplates that, to the extent possible, one or more features of any embodiment or aspect can be combined with one or more features of any other embodiment or aspect.

What is claimed is:

1. An apparatus comprising a divider and a carabiner in a fall arrest system, the carabiner having:

(1) a frame; and (2) an openable gate attached to the frame at a pivot point and configured to be moved between an open position, wherein at least one component of a harness arrangement and at least one fall arrest device can be attached to or detached from the frame, and a closed position, wherein the at least one component of the harness arrangement and the at least one fall arrest device can be secured to the frame, wherein the gate is configured to slide longitudinally and then pivot about the pivot point for movement between the open position and the closed position, the divider comprising:

a body having:

(i) a central body portion; and (ii) a plurality of connection portions extending from the central body portion and configured to attach the divider to at least a portion of the frame, wherein the plurality of connection portions are spaced and divide the carabiner into a plurality of areas for connection of the at least one component of the harness arrangement and the at least one fall arrest device, and wherein the central body portion comprises a stop formation that, when engaged, is positioned adjacent a longitudinal end face of the gate opposite the pivot point such that contact of the longitudinal end face of the gate with the stop formation prevents the gate from longitudinally sliding.

2. The divider of claim 1, wherein the at least one stop formation is formed separately from the divider.

3. The divider of claim 1, wherein the at least one stop formation is formed integrally with the divider.

4. The divider of claim 1, wherein at least one connection portion of the plurality of connection portions comprises a collar extending around the frame.

5. The divider of claim 4, wherein the collar is positioned substantially adjacent to and spaced from one end of the gate.

6. The divider of claim 4, wherein the collar is configured to facilitate the swiveling of the divider from an engaged position, wherein all of the plurality of connection portions are attached to the frame, to a disengaged position, wherein only the collar remains attached to the frame.

7. The divider of claim 1, wherein, when attached, at least one of the plurality of connection portions is slidable along the frame and configured to facilitate complete removal of the divider from the carabiner.

8. The divider of claim 1, wherein at least one connection portion of the plurality of connection portions are removably attachable to the frame.

9. The divider of claim 8, wherein the at least one connection portion comprises a substantially C-shaped clip member that is configured to fit at least partially around at least a portion of the frame.

10. The divider of claim 9, wherein the substantially C-shaped clip member is substantially deformable or flexible, such that the substantially C-shaped clip member can be frictionally engaged with the frame.

11. The divider of claim 1, wherein at least a portion of the body is positionable substantially adjacent the gate.

12. The divider of claim 1, wherein the central body portion comprises at least one edge extending substantially adjacent to a side of the gate, such that, when the divider is attached to the frame, the gate is prevented from pivoting to the open position.

13. The divider of claim 1, wherein the plurality of connection portions define four areas, comprising: (1) a first area for connection of a first fall arrest device; (2) a second area for connection of a second fall arrest device; (3) a third area for connection of the at least one component of the harness arrangement; and (4) a fourth area at least partially surrounding the gate.

14. The divider of claim 1, further comprising at least one rib formed on the body at least partially along at least one of the plurality of connection portions.

15. A fall arrest system, comprising:

a harness arrangement removably attachable to a user;

at least one fall arrest device having a safety line having a connector on an end thereof, the connector configured to be secured to an anchor point;

a carabiner comprising a frame and an openable gate attached to the frame at a pivot point and configured to be moved between an open position, wherein at least one component of the harness arrangement and the at least one fall arrest device can be attached to or detached from the frame, and a closed position, wherein the at least one component of the harness arrangement and the at least one fall arrest device can be secured to the frame, wherein the gate is configured to slide longitudinally and then pivot about the pivot point for movement between the open position and the closed position; and a divider comprising a body having:

(i) a central body portion; and (ii) a plurality of connection portions extending from the central body portion and configured to attach the divider to at least a portion of the frame, wherein the plurality of connection portions are spaced and divide the carabiner into a plurality of areas for connection of the at least one component of the harness arrangement and the at least one fall arrest device, wherein the central body portion comprises a stop formation that, when engaged, is positioned adjacent a longitudinal end face of the gate opposite the pivot point such that contact of the longitudinal end face of the gate with the stop formation prevents the gate from longitudinally sliding.

16. The fall arrest system of claim 15, wherein at least one connection portion of the plurality of connection portions comprises a collar extending around the frame.

17. The fall arrest system of claim 15, wherein the collar is positioned substantially adjacent to and spaced from one end of the gate.

18. The fall arrest system of claim 15, wherein the plurality of connection portions define four areas, comprising: (1) a first area for connection of a first fall arrest device; (2) a second area for connection of a second fall arrest device; (3) a third area for connection of the at least one component of the harness arrangement; and (4) a fourth area at least partially surrounding the gate.

19. The fall arrest system of claim 15, wherein the at least one stop formation is formed separately from the divider.

20. The fall arrest system of claim 15, wherein the at least one stop formation is formed integrally with the divider.

21. The divider of claim 1, wherein the divider comprises four separate connection portions.

* * * * *